Aug. 14, 1962    S. A. ROBINSON    3,049,605
WELDING METHOD
Filed Dec. 1, 1958    2 Sheets-Sheet 1

INVENTOR.
SAMUEL A. ROBINSON
BY
*Carl H. Synnestvedt*
AGENT

Aug. 14, 1962 S. A. ROBINSON 3,049,605
WELDING METHOD
Filed Dec. 1, 1958 2 Sheets-Sheet 2

INVENTOR.
SAMUEL A. ROBINSON
BY
AGENT

United States Patent Office 3,049,605
Patented Aug. 14, 1962

3,049,605
WELDING METHOD
Samuel A. Robinson, Telford, Pa., assignor, by mesne assignments, to Philco Corporation, Philadelphia, Pa., a corporation of Delaware
Filed Dec. 1, 1958, Ser. No. 778,048
3 Claims. (Cl. 219—10.41)

This invention relates generally to the art of joining metals, and more particularly to a method of autogenously welding eutectic forming alloys of non-eutectic composition.

In the welding of intricate metal parts into an integral structure, and in particular where the individual parts are precision made and cooperably define apparatus admitting of small dimensional variation, it is desirable to provide a method of fabrication which insures structural integrity of the component parts and allows only minimal dimensional variation and change in physical characteristics of the parts during juncture.

Conventional metal-joining techniques have proven inadequate in applications requiring high precision assembly. Fusion welding, for example, requires that the surfaces of the metal parts being joined be brought to the molten state. This has necessitated the imposition of a temperature considerably higher than the melting point of the parts being joined, and while the union or consolidation is localized, thermal changes such as expansion and contraction result in a loss of dimensional definition which frequently cannot be tolerated. Resort to pressure welding techniques only aggravates the problem and results in severe distortion of the welded parts, not only in the area of juncture, but also in contiguous regions as well. Brazing and soldering methods, on the other hand, introduce unpredictable amounts of bonding material between the surfaces being joined as a result of the uncontrollable spread of the soldering material, a characteristic which is incompatible with precision assembly.

Accordingly, it is an object of this inventon to provde a novel method of joining metals which obviates the limitations of prior art devices and permits the welding of precision parts, particularly those of low thermal mass, with minimal loss of structural form and definition.

It is a further and more particularized object of this invention to provide a method of welding alloys which enables the employment of welding temperatures insuring minimal change in dimension and physical characteristics during welding juncture.

It is a still further object of this invention to provide a method of welding which is both simple and inexpensive and has extended application to alloy systems generally.

These and other objects within contemplation will be more readily understood by reference to the following detailed description and drawings, in which.

The invention has particular application to alloy systems which exhibit a pronounced two-phase plastic zone or transitional field between the liquid and solid phases of the alloy system, the method comprises the steps of bringing the surfaces to be joined into abutting relation and then heating the assembly to a temperature lying within the two-phase field of that particular alloy, the temperature being so chosen that the dominant mass of the material remains in the solid phase with only a sufficient amount of the material reverting to the liquid phase to insure adequate juncture of the mating parts. By this technique, I have found that changes in form, dimension, and physical characteristics are held to a minimum during coalescing of the mating surfaces.

For purposes of illustration the invention will be described with reference to the fabrication of a wave-guide insert-choke assembly made of "coin silver." This particular alloy is a non-eutectic composition of a eutectic forming alloy system and is composed of 10% copper and 90% silver. This alloy exhibits a pronounced transitional zone between its liquid and solid phases which admits of the required degree of temperature control permitting welding without loss of the requisite structural definition. Structural integrity of the parts is insured by the simple expedient of using the proper welding temperature, the relative proportions of each of the phases existing within the alloy system during welding being readily regulated by proper temperature selection.

For each alloy system having the appropriate solid-liquid, two-phase expanse there is a choice of temperatures at which juncture of the mating parts may be effected without appreciable change in the form or dimensions of the mating parts, the degree of change allowable being dictated by the use to which the welded parts are to be put. The operating conditions which are conducive to the desired end result may be readily optimized by limited experimentation. It was found, for example, that parts made of coin silver, could be satisfactorily welded without perceptible dimensional change by heating to a temperature approximately 10° above its solidus or eutectic temperature of 779.4°C. Where dimensional control is not unduly critical considerable relaxation of working tolerances may be effected permitting a wide latitude in the choice of a suitable welding temperature.

Figure 1:
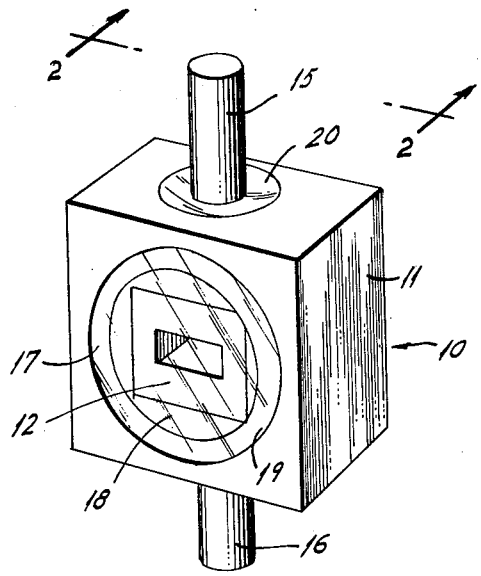
FIGURE 1 is an enlarged perspective view showing a crystal rectifier assembly embodying structure made in accordance with the present invention.

Now making detailed reference to the drawings, FIGURE 1 depicts an enlarged view of a crystal rectifier assembly 10 embodying structure made in accordance with the present invention, the assembly comprising a block 11 hermetically housing a wave guide insert 12 and associated whisker and crystal stud assemblies 13 and 14 (shown in FIGURE 2), carried respectively within terminal sleeves 15 and 16. To provide an hermetic seal, the sides of the block 11 are recessed as at 17 in order to accommodate a thin disc of mica 18 which is sealed in airtight relation to the block 11 by a peripheral rim of glass 19. To complete the encapsulation, the terminal sleeves 15 and 16 are sealed to the housing 11 by glass beads 20.

Figure 2:
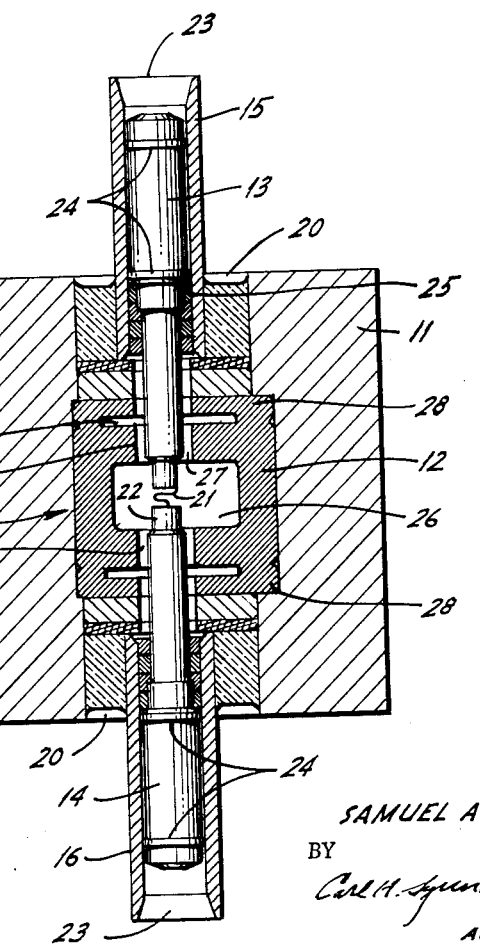
FIGURE 2 is a sectional view looking in the direction of the line 2—2 of FIGURE 1.

The terminal sleeves as seen in FIGURE 2, serve both as insulated output terminals and as means for locating the whisker 21 and crystal blank 22 carried, respectively, by studs 13 and 14. Closing of the terminal sleeve ends 23 is accomplished by solder-sealing the ends after the studs 13 and 14 have been inserted correctly, the sleeves being sealed into place in the housing 11, as mentioned above, with a mica and glass mixture 20 which provides a vacuum-type hermetic seal for each terminal. Each of the above mentioned studs is provided with two rings 24 with outside diameters somewhat greater than the inside diameter of the sleeves. The difference in diameters controls the pressure during assembly, and the distance between the two rings at each stud aids in the accuracy of centering. Because of the interference fit between the stud rings and the inside of the terminal sleeves, it is highly probable that metal chips or dust will be broken loose from the metal parts and will drop into the interior of the housing. Accordingly, Teflon sleeves 25 have been placed on the studs between the ring and the interior of the housing. These sleeves are dimensioned for a slide fit on the inside wall of the sleeves, and are pushed ahead of the stud during assembly by the shoulder formed by the first ring. These sleeves are effective in trapping any foreign matter at a location where no harm results. To permit insertion of the whisker and crystal carrying studs within the wave guide channel 26, formed by the wave guide insert 12, the insert is provided with concentrically aligned apertures 27 in opposed wall portions. The combination of these holes with the conducting studs 13 and 14 constitute a coaxial line in series connection with the wave guide of which the insert 12 forms a part, and if not properly terminated can result in excessive losses. In order to reduce power loss, chokes 28 are provided. It is in relation to the fabrication of the wave guide insert-choke assembly 29 (see FIGURE 3) comprised of the insert 12 and choke elements or plates 28 that the method steps of the invention are described.

Figure 3:
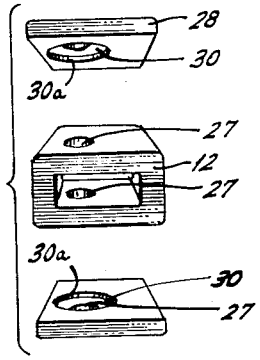
FIGURE 3 is a greatly enlarged perspective illustration of the wave guide insert and choke elements prior to their assembly.

The elements 28 seen most clearly in FIGURE 3 prior to their juncture with insert 12, comprise a thin apertured plate containing a cylindrically recessed portion 30 coaxially disposed relative to said aperture. The dimensioning of this recess is extremely critical since the length of the ledge 31, seen most clearly in FIGURE 2, formed by the juncture of the plate 28 and insert 12, added to the length of the wall portion 32 formed by aperture 27, conjointly serve to form the required half wave length series termination required to minimize loss of RF power and to optimize the effectiveness of the choke. Where extremely high frequencies are employed, the wave guide cross-sectional dimensioning becomes exceedingly small. For example the illustrated insert-choke assembly 29 is designed for 70,000 megacycle transmission and when assembled has an outside dimension of approximately one-quarter inch on a side. Loss of definition of the minute recess 30, as by excessive filleting during welding can completely neutralize the effectiveness of the choke.

It is necssary to fabricate the elements comprising the insert and choke assembly individually, rather than to machine the assembly from a single part, and subsequently to join them into an integral assembly. To assemble these parts, however, by ordinary metal-joining procedures, as mentioned above, results in loss of the required dimensional precision. Accordingly, resort has been made to the method steps of this invention to insure against loss of the requisite precision.

Figure 4:
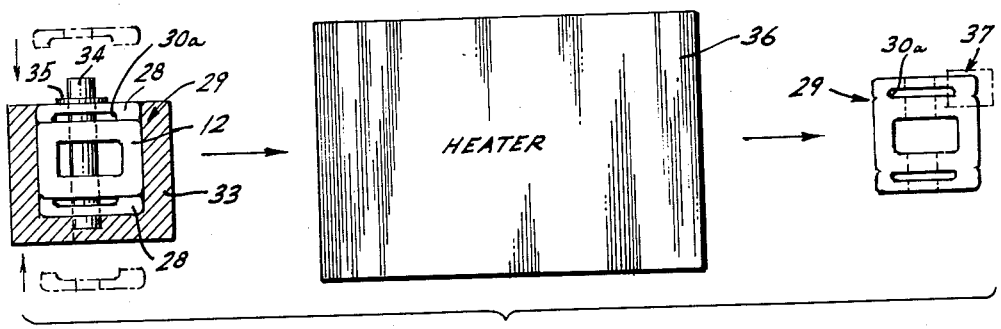
FIGURE 4 is a graphic representation of the method steps employed in fabricating the insert-choke assembly shown in FIGURE 3.
Figure 5:
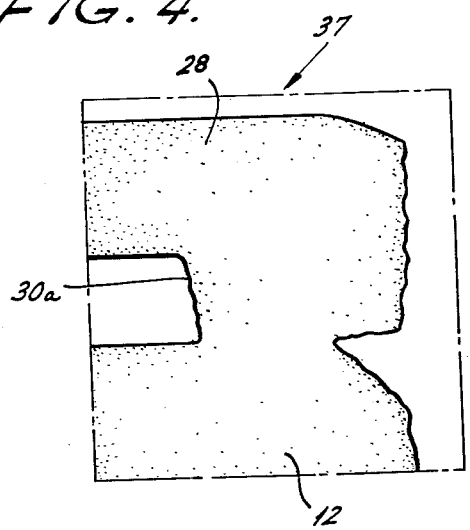
FIGURE 5 is a duplication of a micrograph showing a portion of the insert-choke interface after the inventive alloy diffusion welding of the parts a process termed by the inventor as "diphase" welding.

The parts after being individually fabricated are positioned in required alignment, as shown diagrammatically to the left in FIGURE 4, as for example by being placed in an appropriately dimensioned carbon fixture 33, the parts being maintained in required axial alignment by means of a vertically disposed orienting prong 34 on which the parts are impaled. The surfaces to be joined, where the weight of the assembled parts is not sufficient, are maintained in pressure bearing relation by means of a suitable weight 35. The parts after assembly are then heated to a temperature selected to produce acceptable welding and to provide the required control over change in structural definition as dictated by the specific application. In the illustrated example, using coin silver, this temperature was found to be approximately 790° C. Heating may be accomplished by any of numerous recognized techniques. One method found particularly satisfactory is to place the assembly within an induction furnace 36 in which there is maintained a hydrogen atmosphere, the hydrogen serving as a fluxing medium. The oven is brought to a temperature of 790° C. and maintained at that temperature for a period of time sufficient to insure that the parts attain this equilibrium temperature. The time required in the illustrated example being from 12 to 15 seconds. This time of course will vary in accordance with the size of the parts being fired. This operation causes sufficient plastic flow of the copper-silver alloy for the abutting surfaces to coalesce producing a continuous uninterrupted interface, there being no need for solder or auxiliary fluxing materials. If the parts are sufficiently clean, firing can be carried out in an inert or non-oxidizing atmosphere.

After cooling to room temperature the assembly is removed from the fixture, the finished structure being shown to the right in FIGURE 4. There is no visibly perceptible evidence of any discontinuity or irregularity in the interfacial region of juncture, or excessive filleting of shoulder 30a formed by recess 30. The consolidation of the abutting surfaces in the area designated generally as 37 is uninterrupted.

Figure 6:
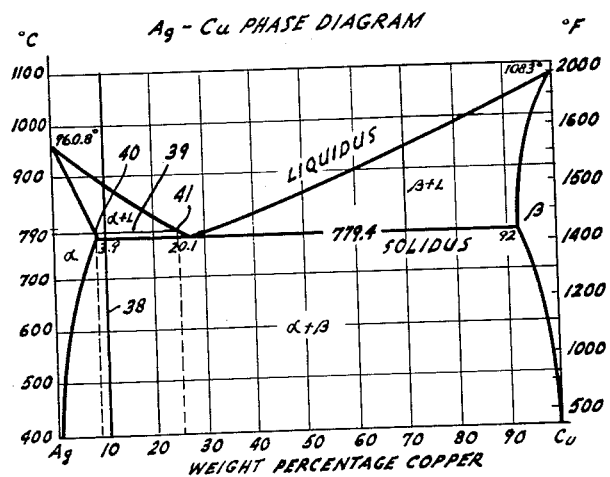
FIGURE 6 is an equilibrium or phase diagram of the silver-copper alloy system.

FIGURE 6 is a substantial duplication of a micrograph taken on one corner of an inlet-choke assembly prepared in accordance with the present invention, as viewed under a magnification of 100 diameters. The juncture between the choke plate and abutting surface of the waveguide inlet is imperceptible even at this magnification, and shows a continuous, uniform interfacial weld.

To better appreciate the principles of the invention, reference is made to FIGURE 6, which depicts the phase or equilibrium diagram for the silver-copper alloy system. The exact composition of coin silver, the material out of which the insert 12 and chokes 28 are made, is represented by the vertical line 38. It will be noted that by heating this particular composition to a temperature of 790° C. that the resulting two-phase mixture is predominantly a solid. Extensive experimentation has none the less shown that welds made at this relatively low temperature are perfectly acceptable and have the advantage of resulting in only very minute change in the dimensions or form of the mating parts. This invention is the more remarkable when the exact phase composition of the alloy at the selected welding temperature is computed. The proportionate amount of the liquid phase as computed by the well known Lever rule is given by the ratio of the difference between the gross alloy composition of 10, representing the percent of copper in solution, and that of the solid phase as determined from the equilibrium diagram, to the difference in composition of the two phases. Thus, in the diagram, the 10:90 copper-silver alloy at the welding temperature indicated by the horizontal line 39 contains solid of composition shown at 40 (9%) and liquid of composition 41 (25%). The proportionate amount of liquid computed in accordance with the above rule indicates that only 1/16 of the composition is in the liquid phase at the welding temperature of 790° C.

It has been found that temperatures below 790° C. result in inadequate welding while higher temperatures result in an increasing loss of structural definition, the temperature to be selected being of course dictated by the particular end result desired.

In summary, this invention relates to a method of welding alloys which embodies the unique step of employing a welding temperature below that of the liquidus temperature of the alloy being used. While, theoretically, single-phase fields of any alloy system must be separated by a two-phase field containing some of each single phase, i.e., liquid plus solid, the most practical application of this invention is to an alloy system in which the transition from one phase to the other occurs over a sufficient temperature span to permit the imposition of reasonable temperature control. The greater the control of temperature, the narrower the temperature span which can be tolerated.

While the invention has been described with reference to preferred practice it is intended that various modifications may be made in such practice without departing

I claim:
1. In the autogenous welding of metal parts of similar composition and composed of a eutectic forming alloy of non-eutectic composition, the method which comprises: placing surface portions of said parts in abutting relation; and heating the zone of juncture to a temperature lying within the two-phase temperature field of the alloy of which said parts are made and to a value effective to produce distortionless welding of said parts.

2. In the autogenous welding of metal parts of similar composition and composed of a eutectic forming alloy of non-eutectic composition, the method which comprises: placing surface portions of said parts in abutting relation; and heating the zone of juncture to a temperature lying between the liquidus and solidus temperature of the alloy of which said parts are made and to a value effective to produce substantially distortionless welding of said parts.

3. The method of welding similar parts composed of a copper-silver alloy of non-eutectic composition which comprises: placing surface portions of said parts to be joined in pressure bearing, abutting relation; and heating the zone of juncture to a temperature above the solidus temperature and below the liquidus for said alloy and to a value effective to produce substantially distortionless juncture of said parts.

References Cited in the file of this patent
UNITED STATES PATENTS
2,226,944    Reeve  ---------------- Dec. 31, 1940